(No Model.)

R. W. COLE.

HOG SORTING APPARATUS.

No. 262,373.

Patented Aug. 8, 1882.

WITNESSES.
H. D. Booge Jr.
Jas. E. Booge

INVENTOR
Robert W. Cole.
PER. W. X. Stevens.
ATTY.

UNITED STATES PATENT OFFICE.

ROBERT W. COLE, OF SIOUX CITY, IOWA.

HOG-SORTING APPARATUS.

SPECIFICATION forming part of Letters Patent No. 262,373, dated August 8, 1882.

Application filed May 22, 1882. (No model.)

*To all whom it may concern:*

Be it known that I, ROBERT W. COLE, a citizen of the United States, residing at Sioux City, in the county of Woodbury and State of Iowa, have invented a certain new and useful Hog-Sorter; and I do hereby declare the following to be a full, clear, and exact description of the invention, such as will enable others skilled in the art to which it appertains to make and use the same.

My invention has for its object the sorting of hogs—that is, separating from a drove such hogs as are wanted; and it consists in a simple machine or device provided with passages and gateways through which the hogs are driven, those selected being forced to take one passage while the rest take another. This is accomplished by means of gates arranged to swing or slide across the passages and close them both or each at the will of the gate-keeper. The usual manner by which this has formerly been accomplished was by several drivers entering the drove and driving out those hogs wanted by means of much labor and trouble.

The following is a description of my invention, reference being had to the accompanying drawings, forming part of this specification, in which—

Figure 1:
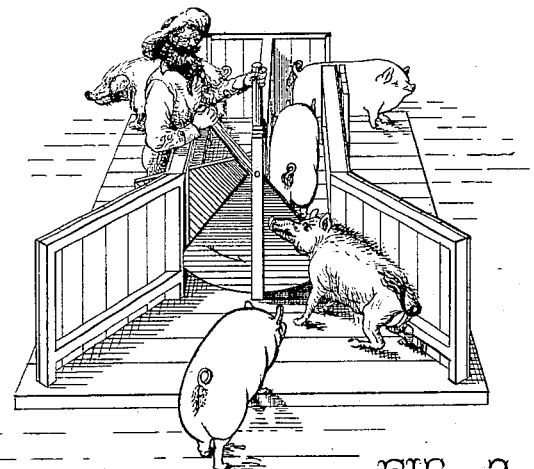
Figure 2:
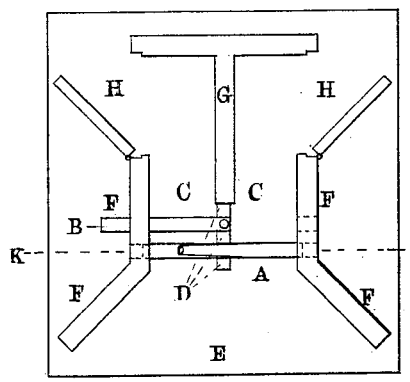
Figure 3:
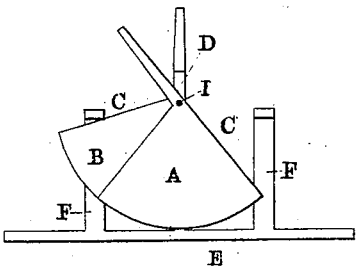

Figure 1 is a perspective view of my invention in use. Fig. 2 is a plan; and Fig. 3 is a transverse vertical section, part in elevation, at K of Fig. 2.

E is a platform or floor, on which are two fences, F, and a partition, G, forming two passages, C, for the hogs to pass through, H H being outlet-gates leading to separate yards.

A B are two gates, hung upon a pin, I, fixed in the posts D at the front end of the partition G, to swing across the passages C, to prevent hogs from entering the passages. The fences F are flaring forward from the gates A B, to assist the driver to corner the hogs and turn them into the passages. Each gate is provided with a handle at its upper end for the gate-keeper to operate it by, and either gate may be swung across either passage, so that both passages may be stopped or either opened at will.

The whole contrivance is portable, being light enough to be taken up by men and carried to any yard. To work it to advantage there should be three yards adjoining, the front of my sorter being fitted to an opening in one yard, while a parting-fence between the other two yards should form a continuation to the rear of my partition G; but other arrangements suitable to different circumstances will suggest themselves to any one who can make a pen. Even the platform and flaring form of the fences are not really necessary to my invention; but two or more swinging or sliding gates arranged to be operated by a gate-keeper to open or close two or more passages at will in order to allow hogs or other animals to pass through or to stop them, the passages and gates being proportioned in each case to the size of the animals to be sorted, so that but one animal can go through each passage at a time, is the main feature of my invention.

It has been found in practice that by the use of my invention two men can easily sort five or six times as many hogs in a given time as without it, when the hogs are tame, and when they are wild or unruly the advantage is still greater, for the gate-keeper may close the gate in front of any hog not wanted, and no matter how fast or hard they crowd up he can open either gate and let through any hog he may select and stop the rest.

I am aware that stock-separators have before been used which are provided with but one passage, from which, if an animal enters the same, he must be allowed to pass to one of the rear yards; but by my separator I can entirely refuse entrance to any number of animals that may be driven to its gates, and finally allow the chosen one (or more) to enter and pass into whichever yard I desire. I therefore do not claim broadly a machine for separating or sorting stock; but

What I claim, and wish to secure by Letters Patent, is—

In a device for sorting hogs and other animals, the combination, with the passages C, provided with openings H, of swinging or sliding gates A B, arranged to close one or both passages at a time, as shown and described.

In testimony whereof I affix my signature in presence of two witnesses.

ROBERT W. COLE.

Witnesses:
H. D. BOOGE, Jr.,
JAS. E. BOOGE.